United States Patent
Smith et al.

(10) Patent No.: US 9,891,388 B2
(45) Date of Patent: Feb. 13, 2018

(54) UNITARY OPTICAL FERRULE

(71) Applicant: 3M INNOVATIVE PROPERTIES COMPANY, St. Paul, MN (US)

(72) Inventors: Terry L. Smith, Roseville, MN (US); Alexander R. Mathews, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/418,048

(22) PCT Filed: Sep. 27, 2013

(86) PCT No.: PCT/US2013/062259
§ 371 (c)(1),
(2) Date: Jan. 28, 2015

(87) PCT Pub. No.: WO2014/055360
PCT Pub. Date: Apr. 10, 2014

(65) Prior Publication Data
US 2015/0205054 A1   Jul. 23, 2015

Related U.S. Application Data
(60) Provisional application No. 61/710,067, filed on Oct. 5, 2012.

(51) Int. Cl.
*G02B 6/38* (2006.01)
*G02B 6/36* (2006.01)

(52) U.S. Cl.
CPC ......... *G02B 6/3833* (2013.01); *G02B 6/3676* (2013.01); *G02B 6/3851* (2013.01); *G02B 6/3652* (2013.01)

(58) Field of Classification Search
CPC ... G02B 6/3833; G02B 6/3676; G02B 6/3851
(Continued)

(56) References Cited

U.S. PATENT DOCUMENTS

| 5,048,917 A | 9/1991 | Komatsu |
| 6,259,856 B1 | 7/2001 | Shahid |

(Continued)

FOREIGN PATENT DOCUMENTS

| CN | 102460257 | 5/2012 |
| EP | 1039322 | 9/2000 |

(Continued)

OTHER PUBLICATIONS

Iwano "Compact and Self-Retentive Multi-Ferrule Optical Backpanel Connector", Journal of Lightwave Technology, 10, Oct. 1999, vol. 10, No. 10. pp. 1356-1362.

(Continued)

*Primary Examiner* — Jerry Blevins
(74) *Attorney, Agent, or Firm* — Clifton F. Richardson

(57) ABSTRACT

A ferrule (10) has a receiving area for receiving and securing an optical waveguide (20) and an optical element (13) for receiving light from an optical waveguide received and secured at the receiving area and changing at least one of a divergence and a propagation direction of the received light. A plurality of registration features (30, 31, 32, 33, 34) are configured to permit a stacking of the ferrule in a stacking direction such that the ferrules in the stack are aligned relative to each other along a length of the ferrule and along a direction perpendicular to the stacking direction.

11 Claims, 8 Drawing Sheets

(58) Field of Classification Search
USPC .................................................... 385/59, 60
See application file for complete search history.

(56) References Cited

U.S. PATENT DOCUMENTS

| | | | |
|---|---|---|---|
| 6,320,651 B1 | 11/2001 | Manhart | |
| 6,817,777 B1 | 11/2004 | Grabbe | |
| 2003/0174998 A1 | 9/2003 | Shevchuk | |
| 2005/0220438 A1* | 10/2005 | Cok | G02B 6/3676 385/146 |
| 2007/0086700 A1* | 4/2007 | Weng | G02B 6/3672 385/33 |
| 2011/0229078 A1* | 9/2011 | Isenhour | G02B 6/3817 385/33 |

FOREIGN PATENT DOCUMENTS

| | | |
|---|---|---|
| JP | 06324221 | 11/1994 |
| WO | WO 2014-055226 | 4/2014 |
| WO | WO 2014-055361 | 4/2014 |

OTHER PUBLICATIONS

International Search report for PCT International Application No. PCT/US2013/062259 dated Jan. 17, 2014, 6 pages.

\* cited by examiner

UNITARY OPTICAL FERRULE

RELATED CASE

The present application is related to jointly-owned patent applications, Ser. No. 61/710,083, entitled, "Optical Connector", and Ser. No. 61/710,077, entitled "Optical Connector" which were filed on the same date herewith and are herein incorporated by reference in their entireties.

FIELD

The disclosure relates to unitary optical ferrules and, in particular, to unitary optical ferrules that includes a registration feature and small form factor.

BACKGROUND

Optical fiber is a popular medium for a number of applications. In particular, optical technology is being utilized more in broadband systems where communications between systems take place on high-speed optical channels. Efficient utilization of the real estate on circuit boards, racks/shelves, back planes, distribution cabinets, etc., is important. Optic fiber devices continue to become miniaturized in view of this.

With the miniaturization of optical modules and optical fiber devices, the management of optical fiber congestion has become an issue at optical interfaces and connection distribution points. One solution is the use of multi-fiber ribbon in which a plurality of optical fibers are organized and molded side by side in a plastic ribbon. It is known to interconnect these ribbon cables by supporting the fibers between two support members made of a monocrystalline material, such as silicon. In the support members are V-grooves formed utilizing photolithographic masking and etching techniques. The fibers are placed side by side in individual V-grooves of one support member and the other mating support member having corresponding V-grooves is placed over the fibers so as to bind or hold the fibers in a high precision, spatial relationship between the mating V-grooves. The top and bottom support members sandwiching the multi-fiber ribbon are bonded together with a clamp or adhesive, forming a ferrule of a multi-fiber connector. Two mating ferrules with the same fiber spacing may then be placed in an abutting relationship so that the ends of the fibers of the respective ferrules are substantially co-axially aligned with one another, thereby forming a multi-fiber connection. If desired, such ferrules can be stacked in order to increase the interconnection density.

Multi-fiber ribbons and connectors have numerous applications in optic communication systems. For instance, some opto-electronic and optical application specific integrated circuits (OASIC) devices, e.g., optical switches, optical power splitters/combiners, routers, etc., have several input and/or output ports arranged as linear arrays to which a plurality of fibers are to be coupled. Further, since optical fibers are attached to launch optical signals into these devices and extract optical signals out of these devices, splicing of arrays of fibers (i.e., a multi-fiber ribbon) to such devices can be achieved using multifiber connectors.

One factor important to the optical efficiency of a multi-fiber connector, whether or not stacked, is the precise alignment of the mating ferrules with regard to one another. As the ferrule structures utilized to achieve the precise axial and lateral alignment of corresponding optical fibers of a multi-fiber connection become smaller, there exists a need for connectors that are likewise space efficient so that full advantage of the miniaturized ferrule can be realized with higher interconnection density. Further, there also exists the need for multi-fiber connectors to be user friendly so that the operation and utility of the multi-fiber connector is intuitive to the workers that will be installing systems utilizing optical components. For example, it is desirable for multi-fiber connectors to have plug-and-play capability, in that they can be quickly and easily coupled to a piece of equipment, device, or one another. There exists a need for miniaturized multi-fiber connectors in order to take advantage of the more space efficient optical ferrules while, at the same time, increasing the functionality and ease of use of such multi-fiber connectors.

BRIEF SUMMARY

The disclosure relates to unitary optical ferrules and, in particular, to unitary optical ferrules that includes a registration feature and small form factor, among other aspects.

In many embodiments a ferrule has a unitary structure and includes a receiving area for receiving and securing an optical waveguide and an optical element for receiving light from an optical waveguide received and secured at the receiving area and changing at least one of a divergence and a propagation direction of the received light. The ferrule further includes a plurality of registration features configured to permit a stacking of the ferrule in a stacking direction such that in a stack of the ferrule, the plurality of registration features prevent a ferrule and an adjacent ferrule from sliding relative to each other in a direction perpendicular to the stacking direction and along a length of the ferrule.

In further embodiments, the ferrule has a receiving area for receiving and securing an optical waveguide and an optical element for receiving light from an optical waveguide received and secured at the receiving area and changing at least one of a divergence and a propagation direction of the received light. A plurality of registration features are configured to permit a stacking of the ferrule in a stacking direction such that the ferrules in the stack are aligned relative to each other along a length of the ferrule and along a direction perpendicular to the stacking direction.

In further embodiments, the ferrule has a first registration feature at a top side of the ferrule and a second registration feature at a bottom side of the ferrule. The first and second registration features are configured to permit a vertical stacking of the ferrule such that the ferrules in the vertical stack are aligned relative to each other along a length of the ferrule and along a width of the ferrule.

In further embodiments, the ferrule has a first registration feature at a first side of the ferrule and a second registration feature at an opposite second side of the ferrule. The first and second registration features are configured to permit a horizontal stacking of the ferrule such that in a horizontal stack of the ferrule, the first and second registration features prevent a ferrule and an adjacent ferrule from sliding vertically and along a length of the ferrule relative to each other.

In further embodiments, the ferrule has a first registration feature at a first side of the ferrule and a second registration feature at an opposite second side of the ferrule, the first and second registration features being configured to permit a horizontal stacking of the ferrule such that the ferrules in the horizontal stack are aligned relative to each other along a length of the ferrule and along a height of the ferrule.

In further embodiments, the ferrule has a unitary structure and includes a receiving area for receiving and securing an optical waveguide and an optical element for receiving light from an optical waveguide received and secured at the receiving area and changing at least one of a divergence and a propagation direction of the received light. The ferrule has a first registration feature at a first side of the ferrule and a second registration feature at an opposite second side of the ferrule. The first and second registration features are configured to permit a horizontal stacking of the ferrule such that in a horizontal stack of the ferrule, the first and second registration features prevent a ferrule and an adjacent ferrule from sliding vertically and along a length of the ferrule relative to each other.

In further embodiments, the ferrule has a unitary structure and includes a receiving area for receiving and securing an optical waveguide and an aperture for limiting a size of light that exits the ferrule, the ferrule being configured so that light from an optical waveguide received and secured at the receiving area fills the aperture and when viewed along a length of the ferrule, a projected area of the aperture is at least 80% of a projected area of the ferrule.

In further embodiments, the ferrule has a unitary structure and includes an array of receiving areas and an array of apertures. Each receiving area is configured to receive and secure an optical waveguide, and each aperture corresponds to a different receiving area and is configured to receive light from an optical waveguide received and secured at the corresponding receiving area and to limit a size of light that exits the ferrule. The ferrule is configured so that light from an optical waveguide received and secured at a receiving area fills the aperture corresponding to the receiving area. When viewed along a length of the ferrule, a sum of projected areas of the apertures is at least 80% of a projected area of the ferrule.

In further embodiments, an optical connector includes a housing and a plurality of ferrules disposed within the housing. Each ferrule has a unitary structure and includes a receiving area for receiving and securing an optical waveguide and at least one registration feature. The at least one registration feature of the ferrules in the plurality of ferrules engage each other to form a stack of aligned ferrules along at least one stacking direction. The engagement prevents a ferrule and an adjacent ferrule from sliding relative to each other in a direction perpendicular to the stacking direction and along a length of the ferrule. A maximum dimension of the stack of ferrules along the at least one stacking direction being less than a sum of maximum dimensions of the individual ferrules in the stack along the at least one stacking direction.

In further embodiments, the housing includes one or more registration features that engage with registration features on one or more ferrules to provide alignment between the ferrules and the housing The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
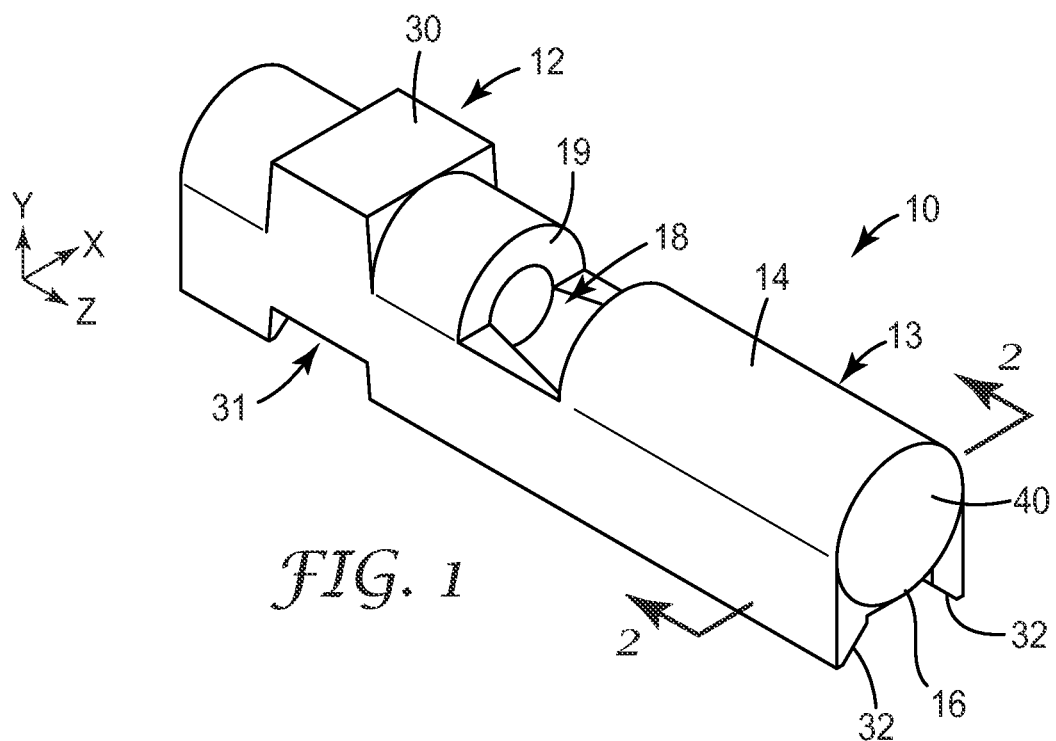
FIG. 1 is a perspective view of a unitary optical ferrule.

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

A unitary construction refers to a construction that does not have any internal interfaces, joints, or seams. In some cases, a unitary structure or construction is capable of being formed in a single forming step such as machining, casting or molding. A unitary construction or article is not formed by bonding components parts together.

The present disclosure relates to unitary optical ferrules and, in particular, to unitary optical ferrules that include a registration feature and small form factor, among other aspects. The registration features are configured to permit a stacking of the ferrule in a stacking direction such that in a stack of the ferrule, the plurality of registration features prevent a ferrule and an adjacent ferrule from sliding relative to each other in a direction perpendicular to the stacking direction and along a length of the ferrule. The ferrule has a unitary structure and includes a receiving area for receiving and securing an optical waveguide and an aperture for limiting a size of light that exits the ferrule. The ferrule is configured so that light from an optical waveguide received and secured at the receiving area fills the aperture and when viewed along a length of the ferrule, a projected area of the aperture is at least 80% of a projected area of the ferrule. While the present disclosure is not so limited, an appreciation of various aspects of the disclosure will be gained through a discussion of the examples provided below.

Figure 2:
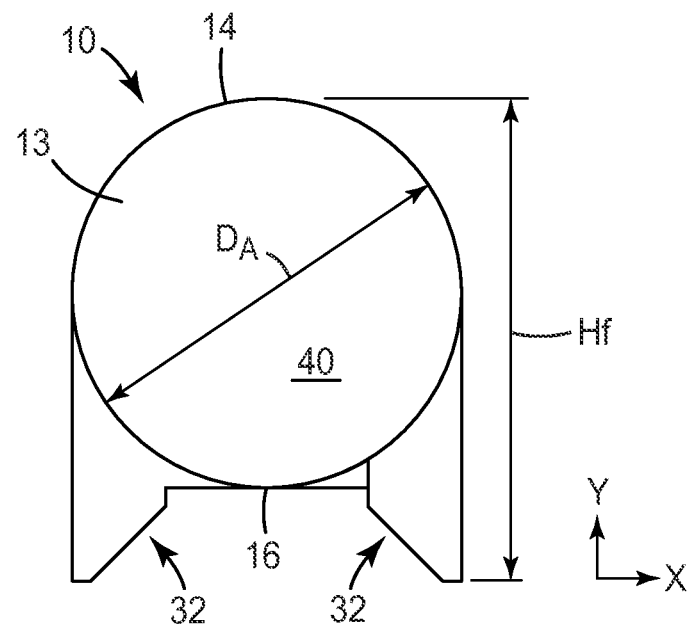
FIG. 2 is a schematic cross-sectional view of FIG. 1 taken along lines 2-2.
Figure 3:
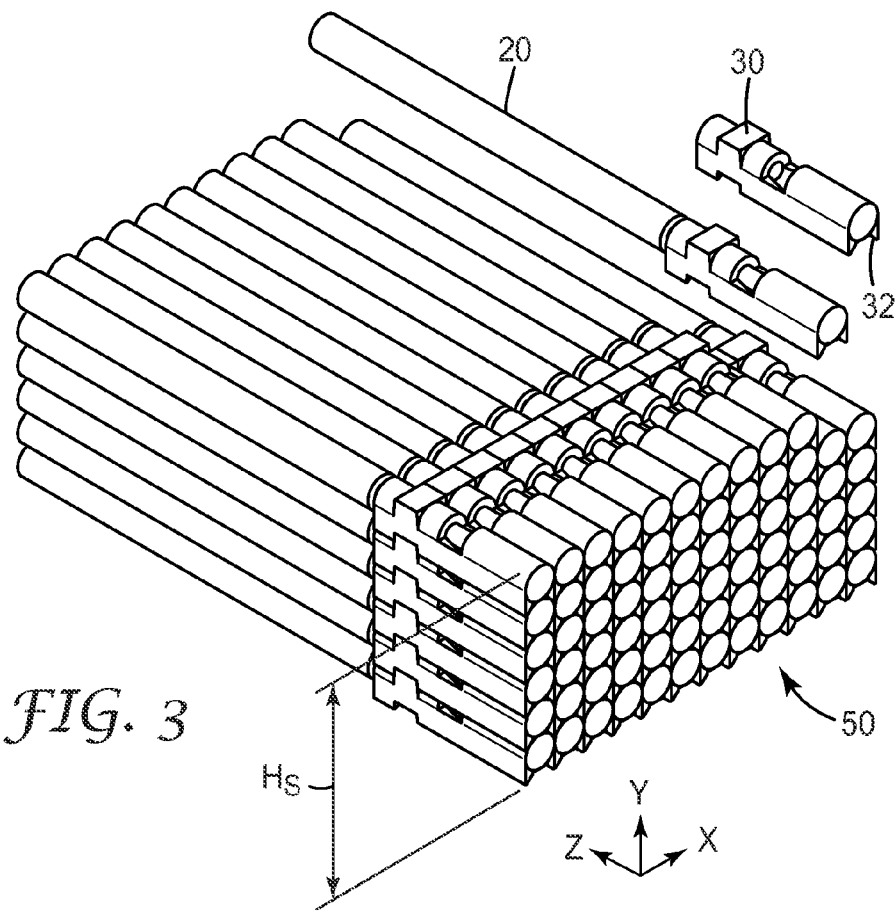
FIG. 3 is a perspective view of an array of optical ferrules.
Figure 4:
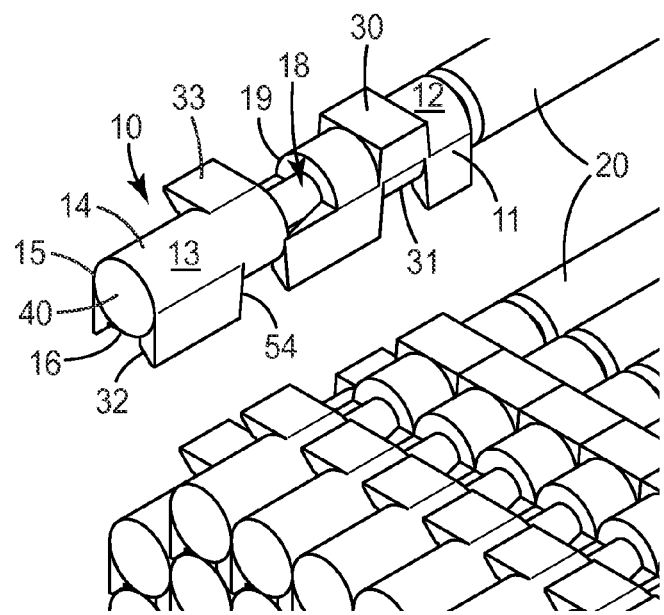
FIG. 4 is a perspective view of another unitary optical ferrule exploded from an array of optical connectors or ferrules.
Figure 5:
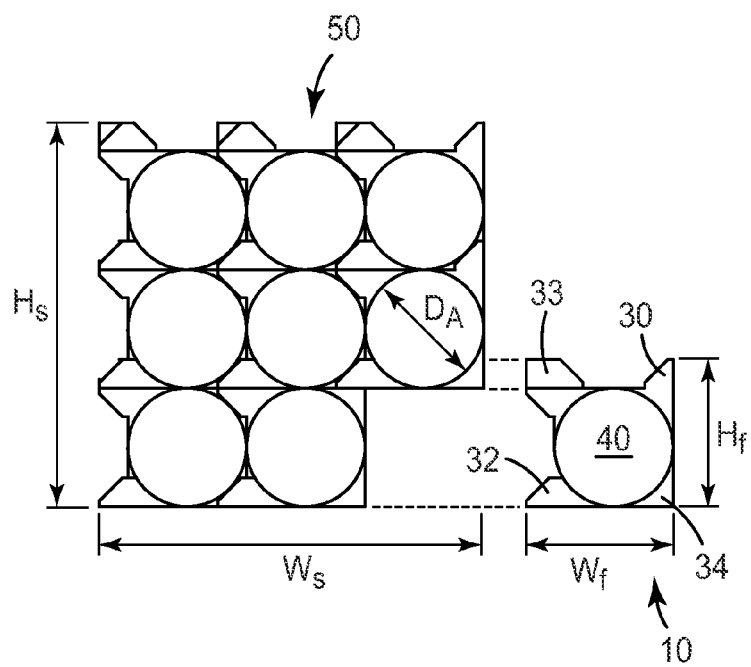
FIG. 5 is a front schematic view of the optical ferrule illustrated in FIG. 4.
Figure 6:
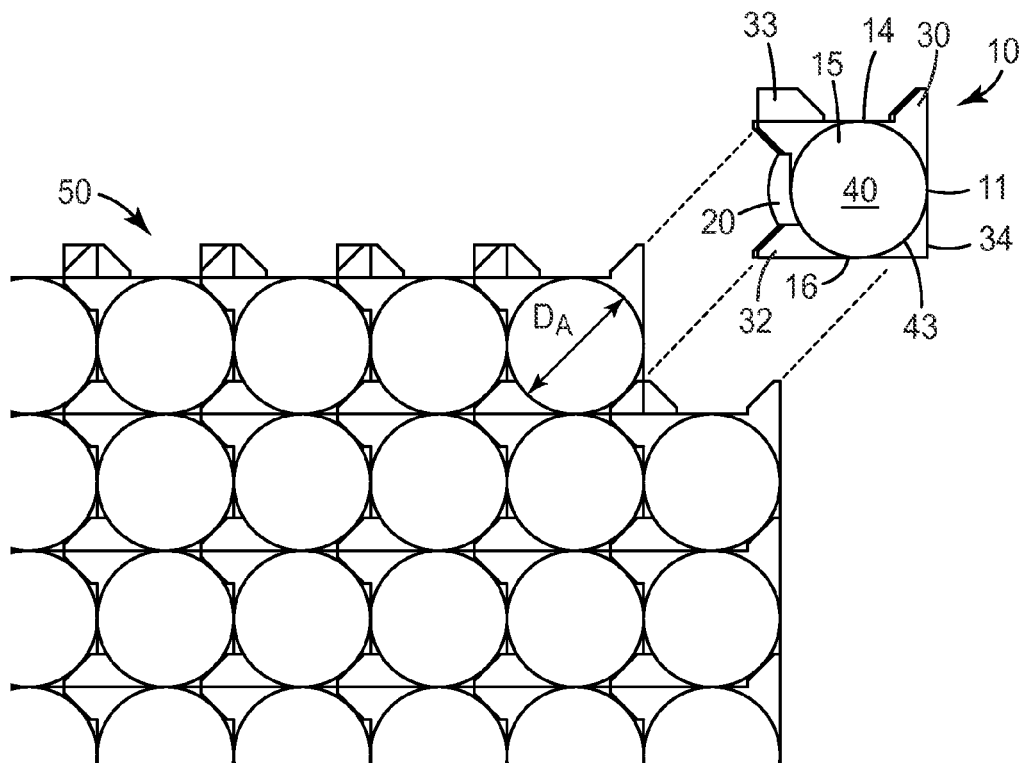
FIG. 6 is a front perspective view of the array of optical ferrules illustrated in FIG. 4.

FIG. 1 is a perspective view of a unitary optical ferrule 10. FIG. 2 is a schematic cross-sectional view of FIG. 1 taken along lines 2-2. FIG. 3 is a perspective view of an array of optical ferrules 50. FIG. 4 is a perspective view of another unitary optical ferrule exploded from an array of optical ferrules. FIG. 5 is a front schematic view of the optical ferrule illustrated in FIG. 4. FIG. 6 is a front perspective view of the array of optical ferrules illustrated in FIG. 4.

Figure 7:
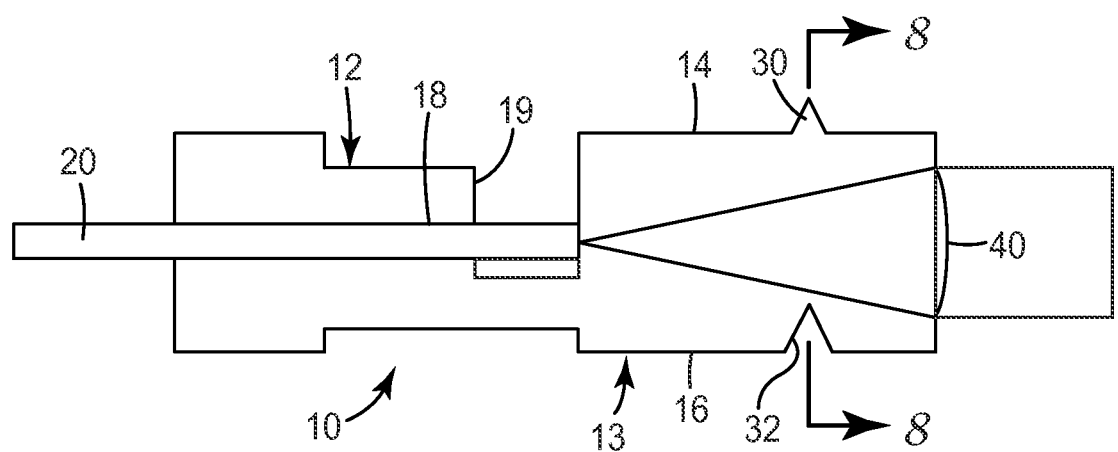
FIG. 7 is a cross-sectional view of another unitary optical ferrule.
Figure 9:
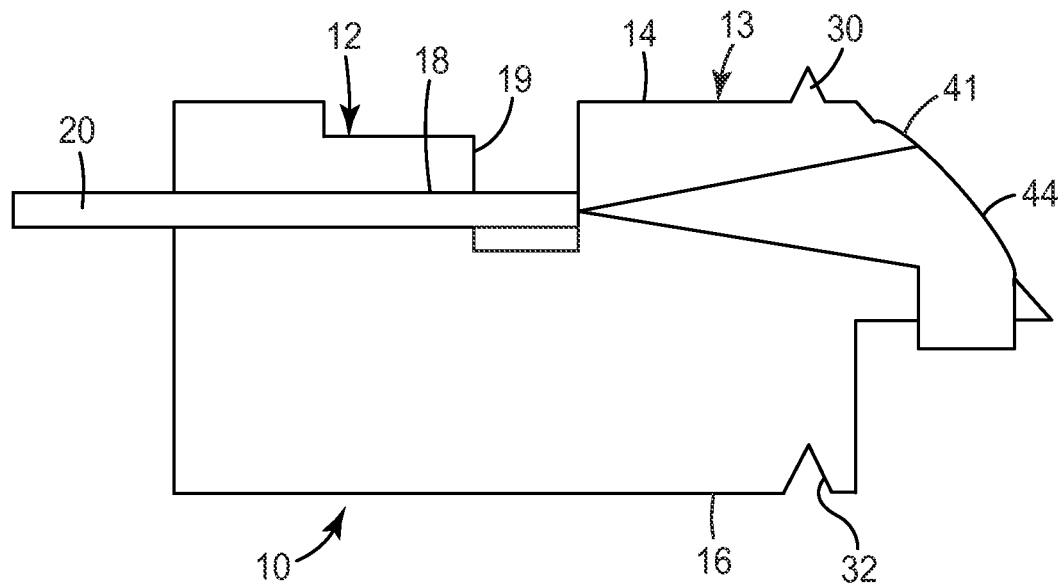
FIG. 9 is a cross-sectional view of another unitary optical ferrule.

The ferrule 10 has a unitary structure and includes a receiving area 12 for receiving and securing an optical waveguide 20 (shown in FIG. 3) and an optical element 13 for receiving light from an optical waveguide 20 received and secured at the receiving area and changing at least one of a divergence and a propagation direction of the received light (illustrated in FIG. 7 and FIG. 9, for example). The optical waveguide 20 can be an optical fiber for example.

A plurality of registration features 30, 31, 32, 33 or 34 are configured to permit a stacking of the ferrule 10 in a stacking direction such that in a stack of the ferrule, the plurality of registration features prevent a ferrule and an adjacent ferrule from sliding relative to each other in a direction perpendicular to the stacking direction and along a length of the ferrule. In other words, a plurality of registration features are configured to permit a stacking of the ferrule in a stacking direction such that the ferrules in the stack are aligned relative to each other along a length of the ferrule and along a direction perpendicular to the stacking direction.

The plurality of the registration features 30, 31, 32, 33 or 34 are configured to permit a stacking of the ferrule 10 along a stacking direction such that a maximum dimension of the stack along the stacking direction is less than a sum of maximum dimensions of the individual ferrules in the stack along the stacking direction. In many embodiments, the plurality of the registration features 30, 31, 32 are configured to permit a vertical stacking of the ferrules such that a maximum height of the vertical stack $H_S$ is less than a sum of maximum heights of the individual ferrules $H_F$ in the vertical stack. In many embodiments, the plurality of the registration features 33 and 34 are configured to permit a horizontal stacking of the ferrules such that a maximum width of the horizontal stack $W_S$ is less than a sum of maximum widths of the individual ferrules $W_F$ in the horizontal stack. In some embodiments, the plurality of the registration features 30, 31, 32, 33 or 34 are configured to permit a two-dimensional horizontal and vertical stacking of the ferrules such that a maximum height of the two-dimensional stack $H_S$ is less than a sum of maximum heights of the individual ferrules $H_F$ in the two-dimensional stack and a maximum width of the two-dimensional stack $W_S$ is less than a sum of maximum widths of the individual ferrules in the two-dimensional stack $W_F$.

As illustrated in FIGS. 1-6, the plurality of registration features can include at least a first registration feature 30 on a top side 14 of the ferrule 10 and a second registration feature 31 or 32 on a bottom side 16 of the ferrule 10. The first registration feature 30 and second registration feature 31, 32 are configured to permit a vertical stacking (along the y direction or axis) of the ferrule 10 such that in a vertical stack of the ferrule, the first and second registration features 30, 31, 32 prevent the ferrule 10 and an adjacent ferrule from sliding horizontally (along the x direction or axis) and along a length (the z direction or axis) of the ferrule 10 relative to each other. In other words, the first and second registration features 30, 31, 32 can be configured to permit a vertical stacking (along the y direction or axis) of the ferrule such that the ferrules in the vertical stack are aligned relative to each other along a length (the z direction or axis) of the ferrule and along a width (along the x direction or axis) of the ferrule 10.

As illustrated in FIGS. 4-6, the plurality of registration features can include at least a first registration feature 34 on a first side 11 of the ferrule 10 and a second registration feature 33 on an opposite second side 15 of the ferrule 10. As illustrated in FIGS. 4-6, the plurality of registration features can include at least a first registration feature 30 on a top side 14 of the ferrule 10, a second registration feature 31 or 32 on a bottom side 16 of the ferrule 10, a third registration feature 34 on a first side 11 of the ferrule 10, and a fourth registration feature 33 on an opposite second side 15 of the ferrule 10. The third registration feature 34 at a first side 11 of the ferrule 10 and a fourth registration 33 feature at an opposite fourth side 15 of the ferrule can be configured to permit a horizontal stacking (along the x direction or axis) of the ferrule such that in a horizontal stack of the ferrule, the third and fourth registration features 34, 33 prevent the ferrule and an adjacent ferrule from sliding vertically (along the y direction or axis) and along a length (along a z direction or axis) of the ferrule relative to each other. In other words, the third registration feature 34 at a first side 11 of the ferrule 10 and a fourth registration feature 33 feature at an opposite fourth side 15 of the ferrule can be configured to permit a horizontal stacking (along the x direction or axis)

of the ferrule such that the ferrules in the horizontal stack are aligned relative to each other along a length (along a z direction or axis) of the ferrule and along a height (along the y direction or axis) of the ferrule.

The receiving area 12 can include a channel 18 extending along at least a portion of the length (i.e., along the z axis) of the ferrule 10. The channel 18 can be configured to receive a light waveguide or cylindrical light fiber 20. The channel 18 can include an opening 19 from the top side 14 of the ferrule 10. When present, the opening 19 can be configured to receive an adhesive for bonding an optical waveguide 20 received in the channel 18 to the ferrule 10. The channel 18 can have any useful shape such as a v-groove, or rectilinear groove or cylindrical groove, as desired.

In further embodiments, the ferrule 10 has a unitary structure and includes a receiving area 12 for receiving and securing an optical waveguide 20 and an aperture 40 for limiting a size of light that exits the ferrule 10. The aperture 40 has a diameter $D_A$. The ferrule 10 is configured so that light from an optical waveguide 20 received and secured at the receiving area 12 fills or substantially fills the aperture 40 and when viewed along a length (z direction) of the ferrule 10, a projected area of the aperture 40 is at least about 80%, or at least about 90%, or at least about 95% of a projected area of the ferrule 10.

In further embodiments, the ferrule 10 has a unitary structure and includes an array of receiving areas and an array of apertures 50. Each receiving area is configured to receive and secure an optical waveguide 20. Each aperture 40 corresponds to a different receiving area and being configured to receive light from an optical waveguide 20 received and secured at the corresponding receiving area 12 and limit a size of light that exits the ferrule 10. The ferrule 10 is configured so that light from an optical waveguide 20 received and secured at a receiving area 12 fills the aperture 40 corresponding to the receiving area 12. When viewed along a length (z direction) of the ferrule 10, a sum of projected areas of the apertures 40 is at least 80%, or at least about 90%, or at least about 95% of a projected area of the ferrule 10.

The array of the apertures 50 can lie in a same plane (e.g., along the x-y axis) perpendicular to a length direction (z direction) of the ferrule 10. FIGS. 3-6 illustrates the array of receiving areas 12 as a row of receiving areas and the array of apertures 50 as a row of apertures 40. FIGS. 3-6 illustrates the array of receiving areas 12 as a column of receiving areas 12 and the array of apertures 50 as a column of apertures 40. FIGS. 3-6 illustrates the array of receiving areas 12 as a two-dimensional array of receiving areas 12 and the array of apertures 50 as a two-dimensional array of apertures 40. When an optical waveguide 20 is received and secured at each receiving area 12 in the array of receiving areas, light from the optical waveguides 20 illuminates at least 80%, or at least about 90%, or at least about 95% of the output surface 40 or aperture 40 of the ferrule 10 and the light propagating through the output surface 40 or aperture 40 exits the ferrule 10.

The optical waveguide 20 can be secured within the channel 18 of the ferrule 10 generally as illustrated in the cross-sectional views of FIG. 7 and FIG. 9 in any of the ferrule embodiments. The optical waveguide 20 abuts against the optical element 13 portion of the ferrule 10 and light from the optical waveguide 20 transmits or propagates through the optical element 13 along a length (z direction) and exits the ferrule 10 though an aperture 40 or output face 40.

Figure 8:
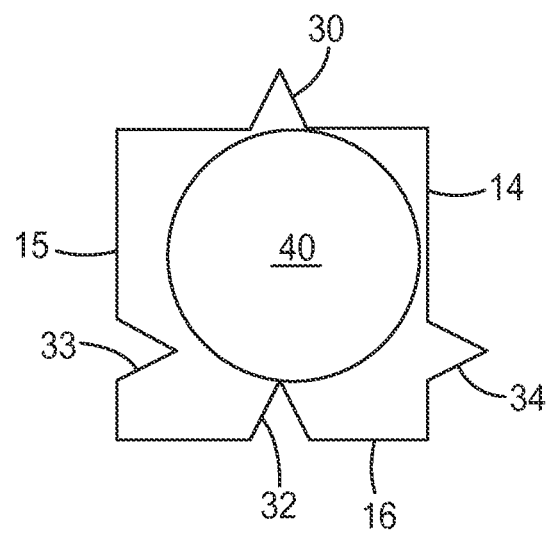
FIG. 8 is a schematic cross-sectional view of FIG. 7 taken along lines 8-8.
Figure 10:
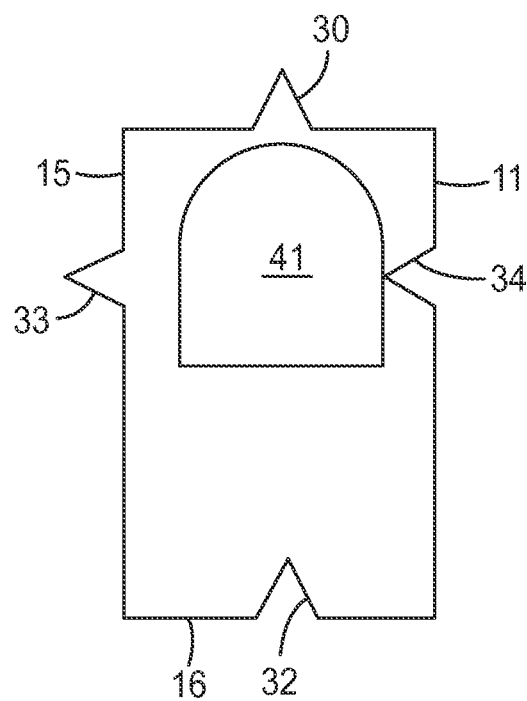
FIG. 10 is a schematic front view of FIG. 9.

FIG. 7 is a cross-sectional view of another unitary optical ferrule. FIG. 8 is a schematic cross-sectional view of FIG. 7 taken along lines 8-8. FIG. 9 is a cross-sectional view of another unitary optical ferrule. FIG. 10 is a schematic front view of FIG. 9. These figures illustrate the divergence and change in direction of light propagating through the optical element 13 of the ferrule 10.

The ferrule 10 has a unitary structure and includes a receiving area 12 for receiving and securing an optical waveguide 20 and an optical element 13 for receiving light from an optical waveguide 20 received and secured at the receiving area and changing at least one of a divergence and a propagation direction of the received light.

A plurality of registration features 30, 32, 33 or 34 are configured to permit a stacking of the ferrule 10 in a stacking direction such that in a stack of the ferrule, the plurality of registration features prevent a ferrule and an adjacent ferrule from sliding relative to each other in a direction perpendicular to the stacking direction and along a length of the ferrule. In other words, a plurality of registration features are configured to permit a stacking of the ferrule in a stacking direction such that the ferrules in the stack are aligned relative to each other along a length of the ferrule and along a direction perpendicular to the stacking direction.

The plurality of the registration features 30, 32, 33 or 34 are configured to permit a stacking of the ferrule 10 along a stacking direction such that a maximum dimension of the stack along the stacking direction is less than a sum of maximum dimensions of the individual ferrules in the stack along the stacking direction, as described above.

As illustrated in FIGS. 7-10, the plurality of registration features can include at least a first registration feature 30 on a top side 14 of the ferrule 10 and a second registration feature 32 on a bottom side 16 of the ferrule 10. The first registration feature 30 and second registration feature 32 are configured to permit a vertical stacking (along the y direction or axis) of the ferrule 10 such that in a vertical stack of the ferrule, the first and second registration features 30, 32 prevent the ferrule 10 and an adjacent ferrule from sliding horizontally (along the x direction or axis) and along a length (the z direction or axis) of the ferrule 10 relative to each other. In other words, the first and second registration features 30, 32 can be configured to permit a vertical stacking (along the y direction or axis) of the ferrule such that the ferrules in the vertical stack are aligned relative to each other along a length (the z direction or axis) of the ferrule and along a width (along the x direction or axis) of the ferrule 10.

The plurality of registration features can include at least a first registration feature 34 on a first side 11 of the ferrule 10 and a second registration feature 33 on an opposite second side 15 of the ferrule 10. The plurality of registration features can include at least a first registration feature 30 on a top side 14 of the ferrule 10, a second registration feature 32 on a bottom side 16 of the ferrule 10, a third registration feature 34 on a first side 11 of the ferrule 10, and a fourth registration feature 33 on an opposite second side 15 of the ferrule 10. The third registration feature 34 at a first side 11 of the ferrule 10 and a fourth registration 33 feature at an opposite fourth side 15 of the ferrule can be configured to permit a horizontal stacking (along the x direction or axis) of the ferrule such that in a horizontal stack of the ferrule, the third and fourth registration features 34, 33 prevent the ferrule and an adjacent ferrule from sliding vertically (along the y direction or axis) and along a length (along a z direction or axis) of the ferrule relative to each other. In other words, the third registration feature 34 at a first side 11 of the ferrule 10 and a fourth registration feature 33 at an opposite fourth side 15 of the ferrule can be configured to permit a horizontal stacking (along the x direction or axis) of the ferrule such that the ferrules in the horizontal stack are aligned relative to each other along a length (along a z direction or axis) of the ferrule and along a height (along the y direction or axis) of the ferrule.

The receiving area 12 can include a channel 18 extending along at least a portion of the length (i.e., along the z axis) of the ferrule 10. The channel 18 can be configured to receive a light waveguide or cylindrical light fiber 20. The channel 18 can include an opening 19 from the top side 14 of the ferrule 10. When present, the opening 19 can be configured to receive an adhesive for bonding an optical waveguide 20 received in the channel 18 to the ferrule 10.

In further embodiments, the ferrule 10 has a unitary structure and includes a receiving area 12 for receiving and securing an optical waveguide 20 and an aperture 40 for limiting a size of light that exits the ferrule 10. The ferrule 10 is configured so that light from an optical waveguide 20 received and secured at the receiving area 12 fills or substantially the aperture 40 and when viewed along a length (z direction) of the ferrule 10, a projected area of the aperture 40 is at least about 80%, or at least about 90%, or at least about 95% of a projected area of the ferrule 10.

FIG. 9 illustrates an optical element 13 with a curved surface 41 receiving light having a first divergence from the optical waveguide 20 and transmitting the received light, the transmitted light having a different second divergence. The optical element 13 can include a curved surface 41 receiving light having a first divergence and propagating along a first direction (e.g., along the z direction) from the optical waveguide 20 and reflecting the received light, the reflected light having a different second divergence and propagating along a different second direction (e.g., along the y direction or x direction). The light incident on the curved surface 41 illuminates an area 44 of the curved surface. The ferrule 10 is configured so that the illuminated area of the curved surface fills or substantially fills the cross section of the ferrule when viewed along a length (z direction) of the ferrule 10, the projected area of the illuminated surface being at least about 80%, or at least about 90%, or at least about 95% of a projected area of the ferrule 10. The optical element 13 can include a light redirecting surface 41 receiving light propagating along a first direction from the optical waveguide and redirecting the received light, the redirected light propagating along a different second direction.

Figure 11:
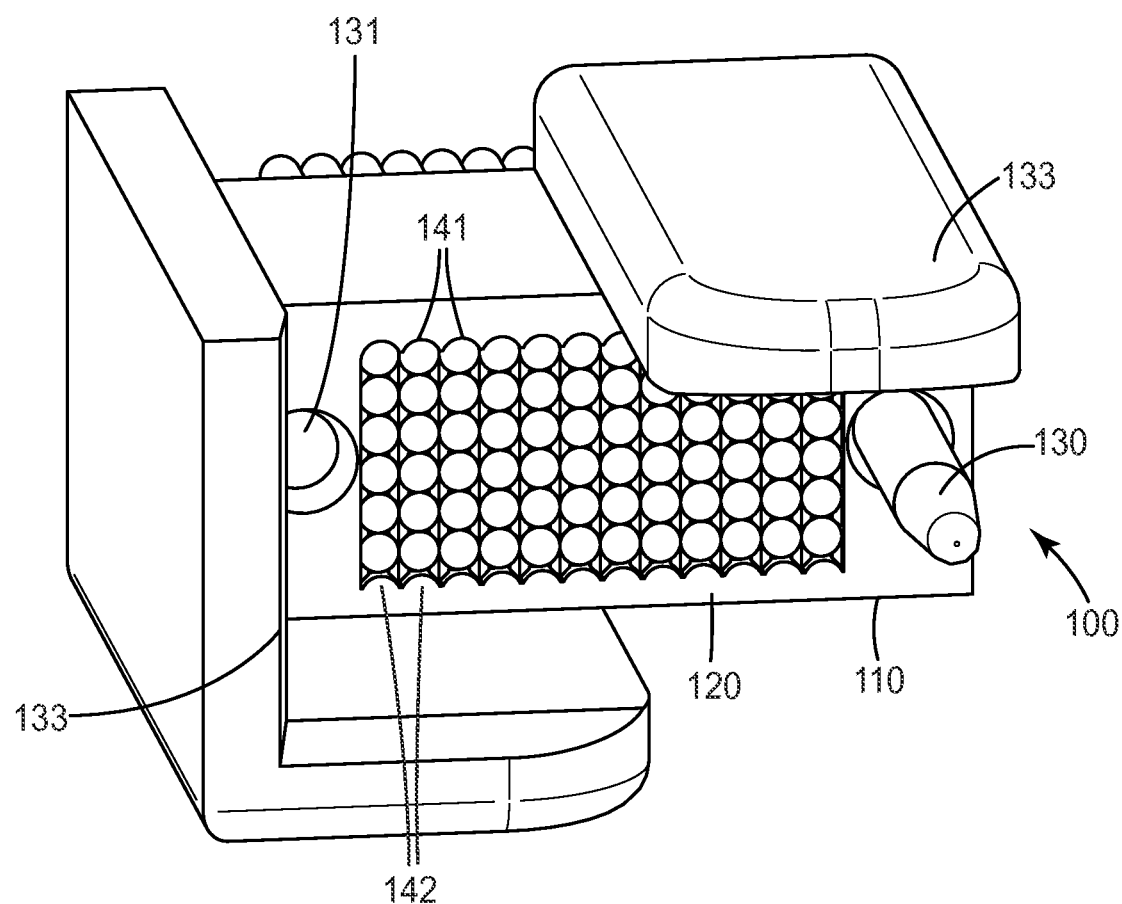
FIG. 11 is a perspective view of an optical connector housing a plurality of ferrules.
Figure 12:
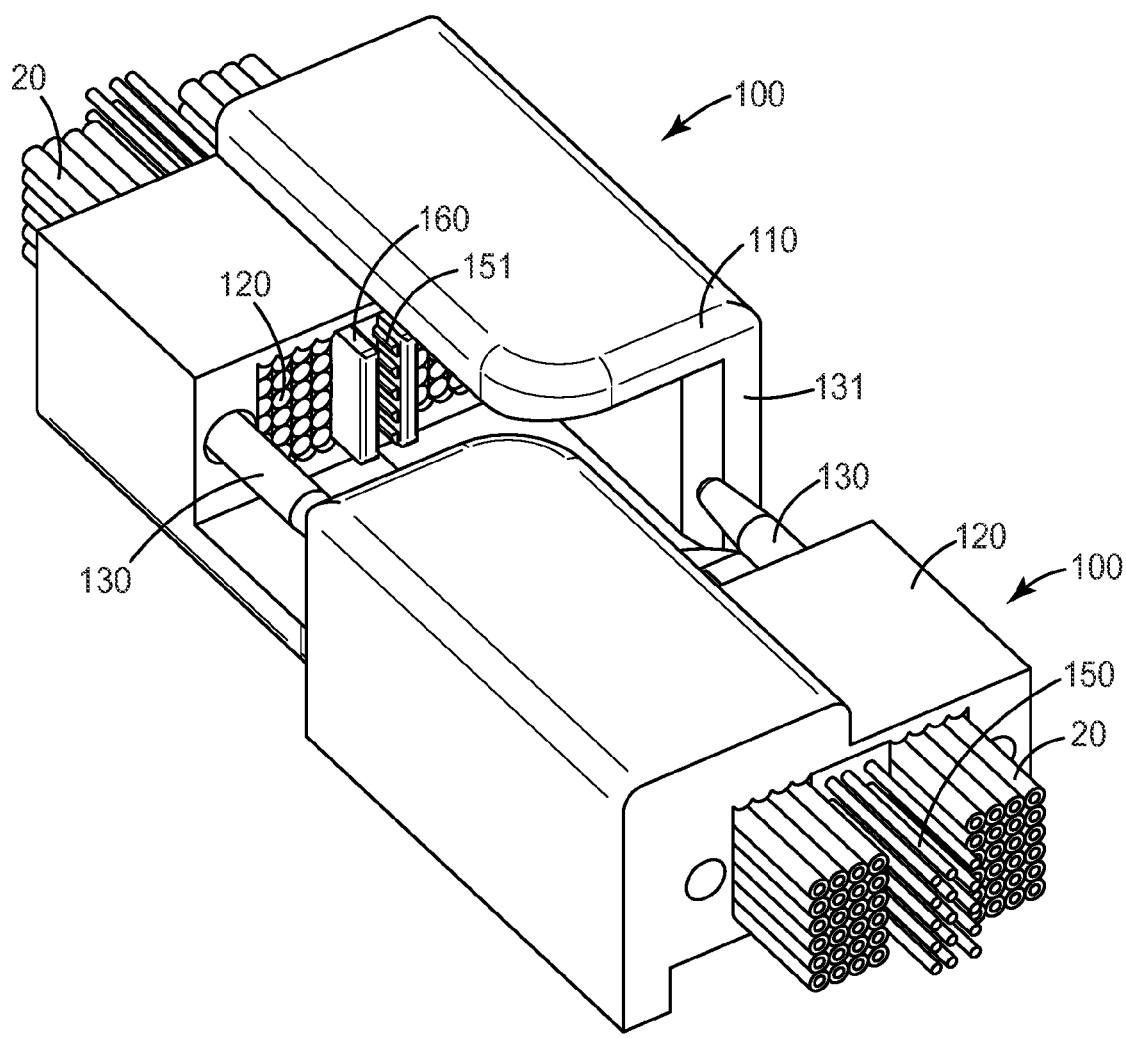
FIG. 12 is a perspective view of an two mating optical connectors housing a plurality of ferrules and electrical connections.

FIG. 11 is a perspective view of an optical connector 100 housing a plurality of ferrules 120. In addition to the registration features which are part of the ferrules and used to provide alignment between ferrules, registration features 141 and 142 are incorporated into the connector housing to provide alignment between the ferrules and the housing. FIG. 12 is a perspective view of an two mating optical connectors 100 housing a plurality of ferrules 120 and electrical connections 150, 151.

In these embodiments, an optical connector 100 includes a housing 110 and a plurality of ferrules 120 disposed within the housing 110. Each ferrule has a unitary structure and includes a receiving area for receiving and securing at least one optical waveguide and at least one registration feature, as described above. The at least one registration feature of the ferrules in the plurality of ferrules engage each other to form a stack of aligned ferrules along at least one stacking direction, as described above. The engagement prevents a ferrule and an adjacent ferrule from sliding relative to each other in a direction perpendicular to the stacking direction and along a length of the ferrule, as described above. A maximum dimension of the stack of ferrules along the at least one stacking direction is less than a sum of maximum dimensions of the individual ferrules in the stack along the at least one stacking direction, as described above.

The optical connector 100 can includes a first mating feature 130 such as a male pin extending from the housing 110 and a second mating feature 131 such as a female orifice to mate with an adjacent optical connector 100 having complementary mating features 130, 131. Further mating features 132, 133 can also extend from or recess into the housing 110 to mate with an adjacent optical connector 100 having complementary mating features.

FIG. 12 illustrates mating optical connectors 100 that further include at least one electrical wire 150 disposed within a sub-housing 160 within the housing 110. The sub-housing 160 having a receiving end for receiving the at least one electrical wire 150 and a mating end 151 for making electrical connection with a corresponding sub-housing of a mating connector. FIG. 12 illustrates an optical connector assembly including a first optical connector 100 mating with a second optical connector 100. Each optical connector 100 includes an optical waveguide 20 received and secured in each ferrule in the plurality of ferrules 120 and a plurality of electrical wires 150 disposed within the sub-housing 160 of the housing 110. Light from each optical waveguide 20 in the first optical connector 100 coupling to a corresponding optical waveguide 20 in the second optical connector 100. Each electrical wire 150 in the first optical connector 100 being electrically connected to a corresponding electrical wire 150 in the second optical connector 100.

Figure 13:
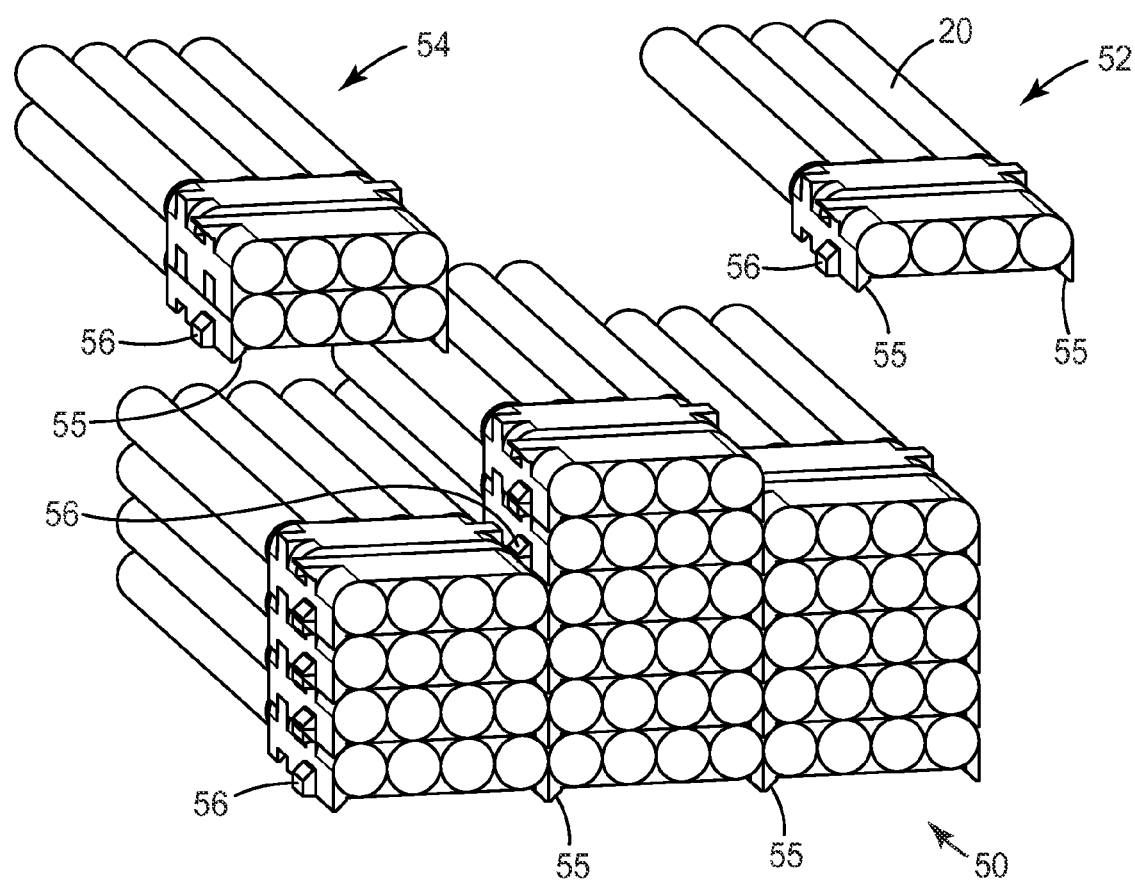
FIG. 13 is a perspective view of a 1D and 2D monolithic arrays of ferrules exploded out of an array of optical ferrules.

In many embodiments, the ferrules have alignment features to align to each other in the same connector 100 and also align optically to corresponding ferrules in the mating connector 100. Ferrules in the first connector 100 align or register with corresponding ferrules in the other connector 100 by aligning to their own housing 120, which is then aligned e.g. via the pins & sockets to the mating housing 120. FIG. 13 is a perspective view of a 1D and 2D monolithic arrays of ferrules exploded out of an array of optical ferrules 50. The 1D array 52 illustrated is a 1×4 optical ferrule monolithic array. The 2D array 54 illustrated is a 2×4 optical ferrule monolithic array. The 1D and 2D monolithic arrays of ferrules can include any useful number of optical ferrules. All of the ferrules are secured to a corresponding optical waveguide 20.

The illustrated monolithic arrays of ferrules and can include one or more registration features that mate with corresponding registration features in a housing (shown in FIG. 11) or array 50. The monolithic arrays of ferrules 52, 54 include, for example, registration features 55 on a bottom side and registrations features 56 on a first or opposing second side. The array of optical ferrules 50 include, for example, registration features 55 on a bottom side and registrations features 56 on a first or opposing second side.

Following are a list of embodiments of the present disclosure

Item 1 is a ferrule having a unitary structure and comprising:
a receiving area for receiving and securing an optical waveguide;
an optical element for receiving light from an optical waveguide received and secured at the receiving area and changing at least one of a divergence and a propagation direction of the received light; and a plurality of registration features configured to permit a stacking of the ferrule in a stacking direction such that in a stack of the ferrule, the plurality of registration features prevent a ferrule and an adjacent ferrule from sliding relative to each other in a direction perpendicular to the stacking direction and along a length of the ferrule.

Item 2 is a ferrule having a unitary structure and comprising:
a receiving area for receiving and securing an optical waveguide;
an optical element for receiving light from an optical waveguide received and secured at the receiving area and changing at least one of a divergence and a propagation direction of the received light; and a plurality of registration features configured to permit a stacking of the ferrule in a stacking direction such that the ferrules in the stack are aligned relative to each other along a length of the ferrule and along a direction perpendicular to the stacking direction.

Item 3 is the ferrule of item 1 or 2, wherein the plurality of the registration features are configured to permit a stacking of the ferrule along a stacking direction such that a maximum dimension of the stack along the stacking direction is less than a sum of maximum dimensions of the individual ferrules in the stack along the stacking direction.

Item 4 is the ferrule of any one of items 1-3, wherein the plurality of the registration features are configured to permit a vertical stacking of the ferrules such that a maximum height of the vertical stack is less than a sum of maximum heights of the individual ferrules in the vertical stack.

Item 5 is the ferrule of any one of items 1-3, wherein the plurality of the registration features are configured to permit a horizontal stacking of the ferrules such that a maximum width of the horizontal stack is less than a sum of maximum widths of the individual ferrules in the horizontal stack.

Item 6 is the ferrule of any one of items 1-3, wherein the plurality of the registration features are configured to permit a two-dimensional horizontal and vertical stacking of the ferrules such that a maximum height of the two-dimensional stack is less than a sum of maximum heights of the individual ferrules in the two-dimensional stack and a maximum width of the two-dimensional stack is less than a sum of maximum widths of the individual ferrules in the two-dimensional stack.

Item 7 is the ferrule of any one of items 1-3, wherein the plurality of registration features comprises at least a first registration feature on a top side of the ferrule and a second registration feature on a bottom side of the ferrule.

Item 8 is the ferrule of any one of items 1-3, wherein the plurality of registration features comprises at least a first registration feature on a first side of the ferrule and a second registration feature on an opposite second side of the ferrule.

Item 9 is the ferrule of any one of items 1-3, wherein the plurality of registration features comprises at least a first registration feature on a top side of the ferrule, a second registration feature on a bottom side of the ferrule, a third registration feature on a first side of the ferrule, and a fourth registration feature on an opposite second side of the ferrule.

Item 10 is the ferrule of any preceding item, wherein the receiving area comprises a channel extending along at least a portion of the length of the ferrule.

Item 11 is the ferrule of item 10, wherein the channel comprises an opening from the top side of the ferrule, the opening being configured to receive an adhesive for bonding an optical waveguide received in the channel to the ferrule.

Item 12 is a ferrule having a unitary structure and comprising:
a receiving area for receiving and securing an optical waveguide;
an optical element for receiving light from an optical waveguide received and secured at the receiving area and changing at least one of a divergence and a propagation direction of the received light; and a first registration feature at a top side of the ferrule and a second registration feature at a bottom side of the ferrule, the first and second registration features being configured to permit a vertical stacking of the ferrule such that in a vertical stack of the ferrule, the first and second registration features prevent a ferrule and an adjacent ferrule from sliding horizontally and along a length of the ferrule relative to each other.

Item 13 is a ferrule having a unitary structure and comprising:
a receiving area for receiving and securing an optical waveguide;
an optical element for receiving light from an optical waveguide received and secured at the receiving area and changing at least one of a divergence and a propagation direction of the received light; and
a first registration feature at a top side of the ferrule and a second registration feature at a bottom side of the ferrule, the first and second registration features being configured to permit a vertical stacking of the ferrule such that the ferrules in the vertical stack are aligned relative to each other along a length of the ferrule and along a width of the ferrule.

Item 14 is the ferrule of item 12 or 13, wherein the first and second registration features are configured to permit a vertical stacking of the ferrule such that a maximum height of the vertical stack is less than a sum of maximum heights of the individual ferrules in the vertical stack.

Item 15 is the ferrule of any one of items 12-14 further comprising a third registration feature at a first side of the ferrule and a fourth registration feature at an opposite fourth side of the ferrule configured to permit a horizontal stacking of the ferrule such that in a horizontal stack of the ferrule, the third and fourth registration features prevent a ferrule and an adjacent ferrule from sliding vertically and along a length of the ferrule relative to each other.

Item 16 is the ferrule of any one of items 12-15 further comprising a third registration feature at a first side of the ferrule and a fourth registration feature at an opposite fourth side of the ferrule configured to permit a horizontal stacking of the ferrule such that the ferrules in the horizontal stack are aligned relative to each other along a length of the ferrule and along a height of the ferrule.

Item 17 is the ferrule of item 16 or 17, wherein the third and fourth registration features are configured to permit a horizontal stacking of the ferrule such that a maximum width of the horizontal stack is less than a sum of maximum widths of the individual ferrules in the horizontal stack.

Item 18 is the ferrule of any one of items 12-17, wherein the receiving area comprises a channel extending along at least a portion of the length of the ferrule.

Item 19 is the ferrule of item 18, wherein the channel comprises an opening from the top side of the ferrule, the opening being configured to receive an adhesive for bonding an optical waveguide received in the channel to the ferrule.

Item 20 is a ferrule having a unitary structure and comprising:
a receiving area for receiving and securing an optical waveguide;
an optical element for receiving light from an optical waveguide received and secured at the receiving area and changing at least one of a divergence and a propagation direction of the received light; and
a first registration feature at a first side of the ferrule and a second registration feature at an opposite second side of the ferrule, the first and second registration features being configured to permit a horizontal stacking of the ferrule such that in a horizontal stack of the ferrule, the first and second registration features prevent a ferrule and an adjacent ferrule from sliding vertically and along a length of the ferrule relative to each other.

Item 21 is a ferrule having a unitary structure and comprising:
a receiving area for receiving and securing an optical waveguide;
an optical element for receiving light from an optical waveguide received and secured at the receiving area and changing at least one of a divergence and a propagation direction of the received light; and
a first registration feature at a first side of the ferrule and a second registration feature at an opposite second side of the ferrule, the first and second registration features being configured to permit a horizontal stacking of the ferrule such that the ferrules in the horizontal stack are aligned relative to each other along a length of the ferrule and along a height of the ferrule.

Item 22 is the ferrule of item 20 or 21, wherein the first and second registration features are configured to permit a horizontal stacking of the ferrule such that a maximum width of the horizontal stack is less than a sum of maximum widths of the individual ferrules in the horizontal stack.

Item 23 is the ferrule of any one of items 20-22 further comprising a third registration feature at a top side of the ferrule and a fourth registration feature at a bottom side of the ferrule configured to permit a vertical stacking of the ferrule such that in a vertical stack of the ferrule, the third and fourth registration features prevent a ferrule and an adjacent ferrule from sliding horizontally and along a length of the ferrule relative to each other.

Item 24 is the ferrule of any one of items 20-22 further comprising a third registration feature at a top side of the ferrule and a fourth registration feature at a bottom side of the ferrule configured to permit a vertical stacking of the ferrule such that the ferrules in the vertical stack are aligned relative to each other along a length of the ferrule and along a width of the ferrule.

Item 25 is the ferrule of item 23 or 24, wherein the third and fourth registration features are configured to permit a vertical stacking of the ferrule such that a maximum height of the vertical stack is less than a sum of maximum heights of the individual ferrules in the vertical stack.

Item 26 is the ferrule of any one of items 20-26, wherein the receiving area comprises a channel extending along at least a portion of the length of the ferrule.

Item 27 is the ferrule of item 26, wherein the channel comprises an opening from the top side of the ferrule, the opening being configured to receive an adhesive for bonding an optical waveguide received in the channel to the ferrule.

Item 28 is the ferrule of any preceding item, wherein the optical element comprises a curved surface receiving light having a first divergence from the optical waveguide and transmitting the received light, the transmitted light having a different second divergence.

Item 29 is the ferrule of any preceding item, wherein the optical element comprises a curved surface receiving light having a first divergence and propagating along a first direction from the optical waveguide and reflecting the received light, the reflected light having a different second divergence and propagating along a different second direction.

Item 30 is the ferrule of any preceding item, wherein the optical element comprises a light redirecting surface receiving light propagating along a first direction from the optical waveguide and redirecting the received light, the redirected light propagating along a different second direction.

Item 31 is the ferrule of any preceding item, wherein the receiving area is configured to receive and secure an optical fiber.

Item 32 is the ferrule of any preceding item having an output face so that light propagating through the output face exits the ferrule, the ferrule being configured to receive light from the output face side of the ferrule and couple at least a portion of the received light to an optical waveguide that is received and secured at the receiving area of the ferrule.

Item 33 is the ferrule of any preceding item, having an output side so that light entering the ferrule from an optical waveguide that is received and secured at the receiving area of the ferrule exits the ferrule from the output side, the ferrule being configured to receive light from the output side of the ferrule and couple at least a portion of the received light to the optical waveguide.

Item 34 is a ferrule having a unitary structure and comprising:
a receiving area for receiving and securing an optical waveguide; and
an aperture for limiting a size of light that exits the ferrule, the ferrule being configured so that light from an optical waveguide received and secured at the receiving area fills the aperture, wherein when viewed along a length of the ferrule, a projected area of the aperture is at least 80% of a projected area of the ferrule.

Item 35 is the ferrule of item 34 further comprising an optical element disposed at the aperture and configured to receive light from an optical waveguide received and secured at the receiving area and change at least one of a divergence and a propagation direction of the received light.

Item 36 is a ferrule having a unitary structure and comprising:
an array of receiving areas, each receiving area being configured to receive and secure an optical waveguide; and
an array of apertures, each aperture corresponding to a different receiving area and being configured to receive light from an optical waveguide received and secured at the corresponding receiving area and limit a size of light that exits the ferrule, the ferrule being configured so that light from an optical waveguide received and secured at a receiving area fills the aperture corresponding to the receiving area, wherein when viewed along a length of the ferrule, a sum of projected areas of the apertures is at least 80% of a projected area of the ferrule.

Item 37 is the ferrule of item 36, wherein the array of the apertures lie in a same plane perpendicular to a length direction of the ferrule.

Item 38 is the ferrule of item 36, wherein the array of receiving areas comprises a row of receiving areas and the array of apertures comprises a row of apertures.

Item 39 is the ferrule of item 36, wherein the array of receiving areas comprises a column of receiving areas and the array of apertures comprises a column of apertures.

Item 40 is the ferrule of item 36, wherein the array of receiving areas comprises a two-dimensional array of receiving areas and the array of apertures comprises a two-dimensional array of apertures.

Item 41 is the ferrule of item 36, comprising an output face so that light propagating through the output face exits the ferrule, the ferrule being configured to receive light from the output face side of the ferrule, at least a portion of the received light propagating through an aperture in the array of apertures and coupling to an optical waveguide that is received and secured at the receiving area corresponding to the aperture.

Item 42 is the ferrule of item 36, comprising an output face so that light propagating through the output face exits the ferrule, the ferrule being configured to receive light from the output face side of the ferrule, the light covering at least 80% of the output face, a portion of the received light propagating through each aperture in the array of apertures and coupling to an optical waveguide that is received and secured at the receiving area corresponding to the aperture.

Item 43 is the ferrule of item 36, comprising an output face so that light entering the ferrule from an optical waveguide in an array of optical waveguides that is received and secured at the receiving area of the ferrule exits the ferrule through the output face, where the ferrule is also configured to couple at least a portion of light entering the output face of the ferrule through an aperture in the array of apertures to the optical waveguide corresponding to the aperture.

Item 44 is the ferrule of item 36, comprising an output face so that light entering the ferrule from an optical waveguide in an array of optical waveguides that is received and secured at the receiving area of the ferrule exits the ferrule through the output face, the light covering at least 80% of the output face, where the ferrule is also configured to couple at least a portion of light entering the output face of the ferrule through an aperture in the array of apertures to the optical waveguide corresponding to the aperture.

Item 45 is an optical connector comprising:
a housing; and
a plurality of ferrules disposed within the housing, each ferule having a unitary structure and comprising:
a receiving area for receiving and securing an optical waveguide; and
at least one registration feature, the at least one registration feature of the ferrules in the plurality of ferrules engaging each other to form a stack of aligned ferrules along at least one stacking direction, the engagement preventing a ferrule and an adjacent ferrule from sliding relative to each other in a direction perpendicular to the stacking direction and along a length of the ferrule, a maximum dimension of the stack of ferrules along the at least one stacking direction being less than a sum of maximum dimensions of the individual ferrules in the stack along the at least one stacking direction.

Item 46 is the optical connector of item 45, wherein each ferrule in the plurality of ferrules comprises a plurality of registration features, the pluralities of the registration features of the ferrules in the plurality of ferrules engaging each other to form a stack of aligned rows and columns of ferrules along horizontal and vertical directions, the engagement preventing a row of ferrules from sliding horizontally relative to an adjacent row of ferrules and a column of ferrules from sliding vertically relative to an adjacent column of ferrules, a maximum width of the stack of ferrules along the horizontal direction being less than a sum of maximum widths of the individual ferrules in the stack along the horizontal direction, a maximum height of the stack of ferrules along the vertical direction being less than a sum of maximum heights of the individual ferrules in the stack along the vertical direction.

Item 47 is the optical connector of item 45, wherein each ferrule in plurality of ferrules further comprises an optical element for receiving light from an optical waveguide received and secured at the receiving area and changing at least one of a divergence and a propagation direction of the received light.

Item 48 is the optical connector of item 45 further comprising at least one electrical wire disposed within a sub-housing within the housing, the sub-housing having a receiving end for receiving the at least one electrical wire and a mating end for making electrical connection with a corresponding sub-housing of a mating connector.

Item 49 is the optical connector of item 45 wherein the housing further comprises registration features that mate with the registration features on one or more ferrules.

Item 50 is an optical connector assembly comprising a first optical connector according to item 43 mating with a second optical connector according to item 45, each optical connector comprising: an optical waveguide received and secured in each ferrule in the plurality of ferrules; and a plurality of electrical wires disposed within the sub-housing of the housing,
light from each optical waveguide in the first optical connector coupling to a corresponding optical waveguide in the second optical connector, each electrical wire in the first optical connector being electrically connected to a corresponding electrical wire in the second optical connector.

Thus, embodiments of UNITARY OPTICAL FERRULE are disclosed. One skilled in the art will appreciate that the compositions described herein can be practiced with embodiments other than those disclosed. The disclosed embodiments are presented for purposes of illustration and not limitation.

What is claimed is:

1. A ferrule having a unitary structure and comprising:
a receiving area for receiving and securing an optical waveguide; and
an aperture for limiting a size of light that exits the ferrule, the ferrule being configured so that light from an optical waveguide received and secured at the receiving area fills the aperture, wherein when viewed along a length of the ferrule, a projected area of the aperture is at least 80% of a projected area of the ferrule, and wherein the ferrule further comprises a plurality of registration features configured to permit a stacking of the ferrule in a stacking direction such that in a stack of the ferrule, the plurality of registration features prevent a ferrule and an adjacent ferrule from sliding relative to each other in a direction perpendicular to the stacking direction and along a length of the ferrule.

2. The ferrule of claim 1 further comprising an optical element disposed at the aperture and configured to receive light from an optical waveguide received and secured at the receiving area and change at least one of a divergence and a propagation direction of the received light.

3. A ferrule having a unitary structure and comprising:
an array of receiving areas, each receiving area being configured to receive and secure an optical waveguide; and
an array of apertures, each aperture corresponding to a different receiving area and being configured to receive light from an optical waveguide received and secured at the corresponding receiving area and limit a size of light that exits the ferrule, the ferrule being configured so that light from an optical waveguide received and secured at a receiving area fills the aperture corresponding to the receiving area, wherein when viewed along a length of the ferrule, a sum of projected areas of the apertures is at least 80% of a projected area of the ferrule, and wherein the ferrule further comprises a plurality of registration features configured to permit a stacking of the ferrule in a stacking direction such that in a stack of the ferrule, the plurality of registration features prevent a ferrule and an adjacent ferrule from sliding relative to each other in a direction perpendicular to the stacking direction and along a length of the ferrule.

4. The ferrule of claim 3, wherein the array of receiving areas comprises a two-dimensional array of receiving areas and the array of apertures comprises a two-dimensional array of apertures.

5. The ferrule of claim 3, comprising an output face so that light propagating through the output face exits the ferrule, the ferrule being configured to receive light from the output face side of the ferrule, at least a portion of the received light propagating through an aperture in the array of apertures and coupling to an optical waveguide that is received and secured at the receiving area corresponding to the aperture.

6. The ferrule of claim 3, comprising an output face so that light entering the ferrule from an optical waveguide in an array of optical waveguides that is received and secured at the receiving area of the ferrule exits the ferrule through the output face, where the ferrule is also configured to couple at least a portion of light entering the output face of the ferrule through an aperture in the array of apertures to the optical waveguide corresponding to the aperture.

7. An optical connector comprising:
a housing; and
a plurality of ferrules disposed within the housing, each ferule having a unitary structure and comprising:
a receiving area for receiving and securing an optical waveguide; and
at least one registration feature configured to reversibly engage with at least one registration feature of a different ferrule in the plurality of ferrules, the at least one registration feature of the ferrules in the plurality of ferrules engaging each other to form a stack of aligned ferrules along at least one stacking direction, the engagement preventing a ferrule and an adjacent ferrule from sliding relative to each other in a direction perpendicular to the stacking direction and along a length of the ferrule, a maximum dimension of the stack of ferrules along the at least one stacking direction being less than a sum of maximum dimensions of the individual ferrules in the stack along the at least one stacking direction.

8. The optical connector of claim 7, wherein each ferrule in the plurality of ferrules comprises a plurality of registration features, the pluralities of the registration features of the ferrules in the plurality of ferrules engaging each other to form a stack of aligned rows and columns of ferrules along horizontal and vertical directions, the engagement preventing a row of ferrules from sliding horizontally relative to an adjacent row of ferrules and a column of ferrules from sliding vertically relative to an adjacent column of ferrules, a maximum width of the stack of ferrules along the horizontal direction being less than a sum of maximum widths of the individual ferrules in the stack along the horizontal direction, a maximum height of the stack of ferrules along the vertical direction being less than a sum of maximum heights of the individual ferrules in the stack along the vertical direction.

9. The optical connector of claim 7, wherein each ferrule in the plurality of ferrules further comprises an optical element for receiving light from an optical waveguide received and secured at the receiving area and changing at least one of a divergence and a propagation direction of the received light.

10. The optical connector of claim 7 further comprising at least one electrical wire disposed within a sub-housing within the housing, the sub-housing having a receiving end for receiving the at least one electrical wire and a mating end for making electrical connection with a corresponding sub-housing of a mating connector.

11. The optical connector of claim 7 wherein the housing further comprises registration features that mate with the registration features on one or more ferrules.

* * * * *